United States Patent Office 3,014,017
Patented Dec. 19, 1961

3,014,017
OLEFIN POLYMERIZATION PROCESS USING CATALYST OF HEAVY METAL HALIDE AND AN ORGANO-DI-ALKALI METAL COMPOUND
Alaric Louis Jeffrey Raum, Teddington, England, assignor to The Distillers Company Limited, Edinburgh, Scotland, a British company
No Drawing. Filed Jan. 2, 1957, Ser. No. 632,020
Claims priority, application Great Britain Feb. 4, 1956
10 Claims. (Cl. 260—93.7)

The present invention relates to a process for the polymerization of α-olefins including ethylene to give high molecular weight products. It is particularly useful when applied to the polymerization of ethylene when it leads to the production of high molecular weight, linear polyethylenes under mild conditions of temperature and pressure.

It has been proposed in Belgian Patent 538,782 to polymerize α-olefins containing at least 3 carbon atoms and in particular α-olefins having the general formula R—CH=CH$_2$, where R is an alkyl, cycloalkyl or aryl group, in the presence or absence of ethylene, by contacting the olefin with a catalyst system formed by the reaction of a compound of a metal occurring in the (a) sub-groups of groups IV to VI inclusive of the periodic table with an organo-compound of a metal occurring in the first three groups of the periodic table. Such polymerization systems are stated to bring about the polymerization of propylene, 1-n-butene, 1-n-pentene, 1-n-hexene, and vinyl hydrocarbons such as styrene either alone or in the presence of ethylene. Similar systems are known to bring about the homopolymerization of ethylene under mild conditions of temperature and pressure and have been described in Belgian Patents 533,362; 534,-792; 534,888 and in our copending United States applications Ser. Nos. 599,299; 614,076, now abandoned, and 622,768, now U.S. 2,916,479. It has also been shown in our co-pending United States applications Ser. Nos. 592,-480 and 593,376, now abandoned, that organo compounds of lead and tin, when mixed with a suitable co-catalyst such as titanium tetrachloride, form a catalyst system which brings about the polymerization of ethylene under mild conditions of temperature and pressure.

It has been suggested that the above type of polymerization reaction involves heterogeneous catalysis which occurs on the surface of compounds of the metal occurring in the (a) sub-groups of groups IV to VI, which are formed when the components of the catalyst are mixed. Italian Patent No. 526,101 describes how the configuration of the resultant polymer may be controlled by control of the particle size of the heterogeneous catalyst system formed using a titanium compound.

It has now been found, most unexpectedly in view of the heterogeneous nature of the catalyst system, that polymers of increased molecular weight can be produced by polymerization systems of the type described above if the organo-compound of a metal used in the preparation of the catalyst system is that of an alkali metal and contains more than one atom of the alkali metal.

Accordingly the present invention is a process for the production of high molecular weight products by contacting an α-olefin with a catalyst system formed by the reaction of a titanium, zirconium or vanadium halide with an organo-compound of an alkali metal characterized in that the organo-compound contains at least two alkali metal atoms per molecule, said metal atoms being directly bonded to different carbon atoms which are joined together either directly or through an intermediate atom or atoms, all bonds forming the direct link between said carbon atoms being of the covalent type.

The process of the present invention is carried out under similar conditions to those previously employed for the polymerization of ethylene or other α-olefins by the prior art processes outlined above. Most suitably the polymerization reaction is carried out with the components of the reaction dispersed throughout an inert liquid vehicle and, when the α-olefin to be polymerized is normally a gas, the latter can be bubbled through the liquid vehicle which contains the catalyst system. The liquid vehicle is preferably a solvent for the compounds which react together to form the catalyst system and for the α-olefin employed. Examples of the preferred liquid vehicles are aliphatic, cycloaliphatic and hydrogenated aromatic hydrocarbons, such as pentane, hexane, cyclohexane, tetrahydronaphthalene, decahydronaphthalene, the higher paraffins, and mixtures thereof. Aromatic hydrocarbons such as benzene, xylene; halogenated aromatic hydrocarbons, such as orthodichlorbenzene and chlorinated naphthalene; and mixtures thereof may also be used. The quantity of liquid vehicle employed may be varied considerably and should be such that the final recovery of the polymer is facilitated.

The catalyst systems of the present invention are generally very active and polymerization may be initiated at normal ambient temperatures. The rate of polymerization is generally increased by raising the temperature of the reaction mixture, but normally it is undesirable to employ temperatures far in excess of 150° C.

It is unnecessary to employ elevated pressures in order to bring about the polymerization of α-olefins according to the present invention. However, for convenience of handling normally gaseous olefins, such as ethylene and propylene, it is sometimes advantageous to employ slightly elevated pressures. Most suitably the present invention is carried out under a pressure between atmospheric and 500 pounds per square inch gauge (p.s.i.g.).

The preparation of the catalyst system and the subsequent polymerization are preferably carried out in the absence of molecular oxygen, carbon dioxide and water. Most suitably all reactions are carried out in an atmosphere of the olefin being polymerized, if this is a gas or, if the olefin is a liquid, in an atmosphere of an inert gas, for example, nitrogen. The catalyst systems or their components are destroyed by reaction with oxygen, carbon dioxide or water and, consequently, if any of these are present in excess no polymerization will take place. Small quantities of oxygen, carbon dioxide or water are removed by reaction with part of the catalyst system or its components and any undestroyed catalyst left after this reaction initiates polymerization in the usual way.

Any α-olefin that can be polymerized according to the prior art methods hereinbefore described can be polymerized by an equivalent process modified according to the present invention. The present invention is particularly useful when applied to the polymerization of ethylene when it gives rise to substantially linear polyethylenes of greater molecular weight than have previously been prepared under similar reaction conditions.

One essential component needed to form the catalyst system of the present invention is a titanium, zirconium or vanadium halide. Any titanium, zirconium or vanadium halide can be employed and most suitably the chlorides of these metals in their tri- or tetravalent state are used. The preferred compounds to use as components of the catalyst system are titanium tetrachloride, vanadium tetrachloride and titanium trichloride when prepared as described in our copending British application No. 13,317/56.

The second essential component needed to form the catalyst system is an organo-compound of an alkali metal, which contains at least two metal atoms in the molecule, said metal atoms being directly bonded to different carbon atoms which are joined together "covalently." By "covalently" is meant that carbon atoms are joined either directly or through an intermediate atom or atoms, all bonds forming the direct link between said carbon atoms being of the covalent type. In the preferred compounds the carbon atoms to which the metal atoms are bonded, are themselves joined through a carbon atom or a chain of carbon atoms, for example a polymethylene chain. Said carbon atoms can also be joined through an aromatic or alicyclic ring system or form part of such a ring. Thus polymetal substituted aromatic compounds can be used in the present invention. Examples of preferred metals are lithium and sodium. Examples of suitable compounds are penta-methylene di-lithium, phenylene di-lithium and phenylene di-sodium.

Polymerization according to the process of the present invention can be brought about by mixing the essential components of the catalyst system in a suitable inert liquid vehicle and then adding the α-olefin to the catalyst system so formed. Alternatively, it may be advantageous, when polymerizing a gaseous α-olefin, for example, ethylene, to mix the components in the presence of the olefin.

When this procedure is adopted one of the components of the catalyst system is mixed with the inert liquid vehicle and the mixture and the vessel containing it saturated with the α-olefin. The second component is then added and it will be found that rapid polymerization takes place and further quantities of α-olefin can be passed into the reaction mixture and polymerized.

The poly-α-olefins produced by the present invention are recovered from the reaction mixtures and worked into a final form by any of the processes described in the literature. It is advantageous to include a mineral acid washing stage in the working up in order to remove inorganic contaminants.

The process may be carried out batchwise or continuously and by its use high yields of high grade polymers can be produced.

The following examples illustrate embodiments of the process of the present invention. The parts by weight (p.b.w.) and the parts by volume (p.b.v.) used in the examples bear the same relationship to each other as do grams to millilitres.

Example 1

5 p.b.w. of 1,5:pentamethylene-di-lithium and 5 p.b.w. of titanium tetrachloride are mixed with 100 p.b.v. of petroleum ether (100–120° C. fraction, aromatic free) in a glass tube which is placed in a steel reactor. Ethylene is admitted at a pressure of 250–300 p.s.i.g. and the reaction allowed to proceed for 90 minutes, more ethylene being admitted, as necessary, to maintain the pressure. After removal from the reactor, the contents are treated with ethanol and strong hydrochloric acid until a pure white product is obtained. This is filtered, washed with ethanol and dried in a vacuum oven. A sample of polyethylene prepared in this manner had a specific viscosity of 14 when determined in o-dichlorbenzene at a concentration of 0.67% and at 150° C. By way of comparison a sample of polyethylene prepared under very similar reaction conditions, but using aluminum di-ethyl iodide in place of the lithium compound, had a specific viscosity of 1.17 thus indicating a considerably lower molecular weight.

A sample of this high molecular weight polyethylene was pressed at 140° C. and gave an extremely tough flexible film. Infra-red spectroscopy confirmed that the product was substantially linear polyethylene of high molecular weight.

Example 2

A reaction is carried out in a manner similar to Example 1, employing 5 p.b.w. of 1,5:pentamethylene-di-lithium and 6 p.b.w. of titanium tetrachloride, for the polymerization of propylene. A good yield of high molecular weight, isotactic polypropylene is obtained.

I claim:

1. A process for the production of high molecular weight products which comprises contacting under polymerization conditions an α-olefin of the formula $R-CH=CH_2$, wherein R is a member selected from the group consisting of alkyl, cyclo-alkyl, aryl and hydrogen, with a catalyst system formed by the reaction of a halide compound selected from the group consisting of titanium, zirconium and vanadium halides with an organo compound of an alkali metal of the formula $M-R_1-M$, wherein M is an alkali metal and $R_1$ is a divalent hydrocarbon radical having at least 2 carbon atoms and being selected from the group consisting of saturated aliphatic hydrocarbon radicals and aromatic hydrocarbon radicals, said metal atoms being directly bonded to different carbon atoms of $R_1$.

2. A process as claimed in claim 1, wherein the α-olefin is ethylene.

3. A process as claimed in claim 1, wherein the α-olefin is propylene.

4. A process for the production of high molecular weight products which comprises contacting ethylene under-polymerization conditions with a catalyst system formed by the reaction of (1) a halide compound selected from the group consisting of titanium, zirconium and vanadium halides with (2) penta-methylene di-lithium.

5. A process for the production of high molecular weight products which comprises contacting ethylene under-polymerization conditions with a catalyst system formed by the reaction of (1) a halide compound selected from the group consisting of titanium, zirconium and vanadium halides with (2) phenylene di-lithium.

6. A process for the production of high molecular weight products which comprises contacting ethylene under-polymerization conditions with a catalyst system formed by the reaction of (1) a halide compound selected from the group consisting of titanium, zirconium and vanadium halides with (2) phenylene di-sodium.

7. A process for the production of high molecular weight products which comprises contacting propylene under polymerization conditions with a catalyst system formed by the reaction of (1) a compound selected from the group consisting of titanium halide, zirconium halide and vanadium halide with (2) penta-methylene di-lithium.

8. A process for the production of high molecular weight products which comprises contacting propylene under polymerization conditions with a catalyst system formed by the reaction of (1) a compound selected from the group consisting of titanium halide, zirconium halide and vanadium halide with (2) phenylene di-lithium.

9. A process for the production of high molecular weight products which comprises contacting propylene under polymerization conditions with a catalyst system formed by the reaction of (1) a compound selected from the group consisting of titanium halide, zirconium halide and vanadium halide with phenylene di-sodium.

10. A process for the production of high molecular weight products which comprises contacting under polymerization conditions and α-olefin of the formula $R-CH=CH_2$, wherein R is a member selected from the group consisting of alkyl, cyclo-alkyl, aryl and hydrogen, with a catalyst system formed by the reaction of a halide compound selected from the group consisting of titanium, zirconium and vanadium halides with 1,5-pentamethylene-di-lithium.

References Cited in the file of this patent

UNITED STATES PATENTS

| | | |
|---|---|---|
| 2,721,189 | Anderson et al. | Oct. 18, 1955 |
| 2,827,445 | Bartolomeo et al. | Mar. 18, 1958 |
| 2,878,240 | Schmerling | Mar. 17, 1959 |
| 2,879,263 | Anderson et al. | Mar. 24, 1959 |
| 2,882,264 | Barnes et al. | Apr. 14, 1959 |

(Other references on following page)

FOREIGN PATENTS

| | | |
|---|---|---|
| 538,782 | Belgium | Dec. 6, 1955 |
| 550,814 | Italy | Nov. 10, 1956 |

OTHER REFERENCES

Laubengayer et al.: Jour. Am. Chem. Soc., vol. 63, page 478 (1941).

Pitzer et al.: Jour. Am. Chem. Soc., vol. 68, page 2204 (1946).

Chemical Abstracts 48, 9314h; Naturwissenschaften (in Eng.), West et al., 40, 142 (1953).

Ziegler: Rubber Chem. and Tech. (1938) page 505, para. 4–7.

Coates: "Organo-Metallic Compounds," Wiley & Sons (N.Y., 1956), pages 17, 74–76.

Rochow et al.: "The Chemistry of Organo-Metallic Compounds," Wiley & Sons (N.Y., 1957), p. 125.